March 1, 1960    R. ANTOINE ET AL    2,926,708
METHOD OF CUTTING OUT OF WOOD, AND OTHER
SUBSTANCES, AND MACHINE FOR THIS CUTTING
Filed Jan. 15, 1958
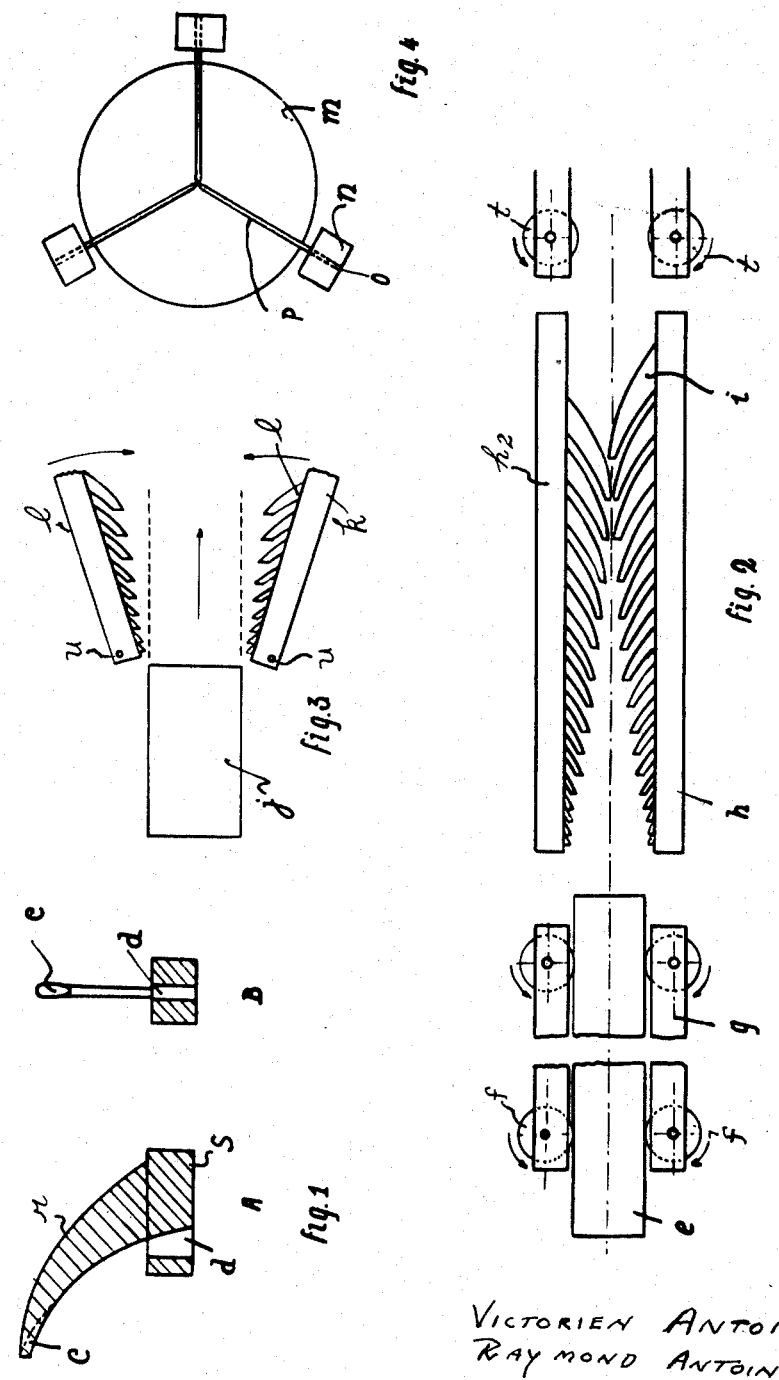
Victorien Antoine
Raymond Antoine
INVENTORS
ATTORNEY

United States Patent Office 2,926,708
Patented Mar. 1, 1960

2,926,708

METHOD OF CUTTING OUT OF WOOD, AND OTHER SUBSTANCES, AND MACHINE FOR THIS CUTTING

Raymond Antoine and Victorien Antoine,
Heverle-Louvain, Belgium

Application January 15, 1958, Serial No. 709,101

1 Claim. (Cl. 143—133)

This invention relates to a saw and to an improved method of cutting wood and other materials.

It is conventional practice for each tooth of a saw to cut chips by severing and by lateral shearing of the fiber. The cutting is done in a plane perpendicular to the direction of the fiber thus cutting very fine chips in the form of sawdust. The cut is mediocre and the sawdust does not have the fibrous quality of the original wood.

Where the sawing is accomplished in the direction of the fiber, as in rip-sawing, the severing force is applied perpendicular to the fiber direction where the force is at a maximum. Thus, the chips are in the form of sawdust just the same as in cross cutting.

It is the object of this invention to apply the cutting in the direction of the fiber by means of a series of knives or gouges each of which will cut a furrow thus removing a more or less continuous shaving.

Another object of the invention is to provide a series of cutters mounted on a carrier in such way that they take successive cuts, the cutters being so spaced and the carrier so formed that the saving from each cut will automatically remove itself by means of channel-like openings in the carrier immediately adjacent each cutter. In this way the searing force of the sawdust forming saws is replaced by cutters employing a smaller severing force. In other words, less power is used by our improved cutters.

The cutters as above described were originally intended only for cutting in the direction of the fiber but it has been found also that there is substantial value in applying it to cross-cutting as where a tree is to be cut down or limbs are to be pruned. In this case the cutters are moved with respect to the wood whereas when boards are to be severed longitudinally, it is easier and simpler to fix the cutters to a table and push the work therepast. In both cases it is advantageous to use the cutters in pairs—that is, a holder for a series of cutters should be opposed by a second holder having a similar series of cutters.

The invention will be better understood with reference to the accompanying drawings in which Figure 1A is a longitudinal section taken through the length of one cutter, Figure 1B is a transverse section taken intermediately through the chip disposing channel of Figure 1A, Figure 2 is a top plan view of the pair of carriers equipped with cutters with work and work feeding means such as may be mounted on a fixed support or table, Figure 3 shows a pair of carriers with cutters, pivotally mounted, and with the work in place ready to be fed therebetween, and Figure 4 is an end view of a log as it may be ripped by our improved cutting means.

More particularly, Figure 1A shows a cutter in the form of a shank portion $r$ having a rounded sharpened end forming a gouge $C$. The base $s$ of the cutter is enlarged in the form of a block so that it will abut other cutters and for firm engagement in a holder or carrier. Each base has channel $d$ through which a shaving from one cutter will not interfere with that of the next succeeding cutter. A wall of the channel is, in effect, an extension of the shank wall traversed by a shaving cut by the gouge $C$.

The cutters are made in increasing lengths so that when they are mounted in a carrier $h$ and when the carrier is placed parallel to the side of a piece of work the cutters will form a series, each cutter of which will remove a shaving equal in thickness and width to that removed by the preceding cutter, as illustrated in Figure 2.

Assume that a piece of work in the form of a board $e$ is resting on a table and that the carrier $h$ is fixed on the table at a height to rip the board $e$ along a predetermined line. The board $e$ may be pushed or driven toward the cutters while being guided by the rollers 5. The rollers are journalled in guides $g$ mounted on the table. As the board is forced into the cutters successive shavings will be removed. As illustrated, it is advantageous to provide a second carrier $h_2$ having a similar series of cutters positioned on the opposite side of the board $e$ so that shavings are removed simultaneously from opposite sides thereof. The board may be sawed completely in two, the severed parts being guided from the cutters by the rollers $t$.

In Figure 3 the carriers $k$ are equipped with a series of cutters $l$ and it is assumed that a piece of work in the form of a board $j$ rests on a table in position to be fed past the cutters $l$. The carriers are pivotally mounted at $u$ on the table so that as the work is fed therebetween they may be angularly adjusted to take a cut of any selected depth.

Figure 4 illustrates the end of a log having three carriers $n$ grouped therearound in equally spaced relation. Each carrier has a series of cutters, the longest of which is indicated by the letter $p$. A channel for removing the shaving from in front of this knife is indicated at $o$.

It will be understood that this invention may be used for materials other than wood and that various changes may be made in the specific arrangement of carrier without departing from the spirit of our invention.

What we claim is:

An apparatus for cutting wood and other substances comprising a series of individual spaced cutters arranged in series one directly in rear of the other, the tips of each of said cutters being sharpened as a gouge, the tip of each cutter being progressively offset with respect to the tip preceding and succeeding it in said series whereby each of said tips follows the path of a preceding tip but at progressively increasing depth, said cutters each having a block-like base for engagement with the bases of adjacent cutters, each of said cutters being substantially inclined with respect to its base with the trailing side thereof curved from its tip to said base all of said cutters being firmly mounted in a carrier, each of said bases having a channel therethrough for the escape of shavings.

References Cited in the file of this patent

UNITED STATES PATENTS

| 192,089 | Spaulding | June 19, 1877 |
| 234,062 | Proctor | Nov. 2, 1880 |
| 1,339,091 | Benefiel | May 4, 1920 |
| 1,483,387 | Serin | Feb. 12, 1924 |

FOREIGN PATENTS

| 140,446 | Sweden | May 19, 1953 |